United States Patent Office 3,297,688
Patented Jan. 10, 1967

3,297,688
17α - ACYL - 16α - HYDROXYPREGNENE DERIVATIVES AND PROCESS FOR PREPARING THEM
Werner Fritsch, Neuenhain, Taunus, and Ulrich Stache, Hofheim, Taunus, Germany, assignors to Farbwerke Hoechst Aktiengesellschaft vormals Meister Lucius & Bruning, Frankfurt am Main, Germany, a corporation of Germany
No Drawing. Filed Dec. 11, 1964, Ser. No. 417,834
Claims priority, application Germany, Dec. 14, 1963, F 41,547; Sept. 17, 1964, F 43,994
15 Claims. (Cl. 260—239.55)

The present invention relates to 17α-cyano-and 17α-acyl-16α-hydroxy-pregnene derivatives in which the acyl radical represents a carboxylic acid radical having 2 to 4 carbon atoms, and to a process for preparing them by condensing 16,17-dehydro-20-oxo-pregnene derivatives with the nitrile oxides of oxalic ester acids to obtain [17,16-d] - 3′ - carbalkoxy-isoxazolino-20-oxo-pregnenes, oxidizing, if desired, a 3-hydroxy group to the 3-oxo group and, if desired, reacting the 3-oxo compound with alkylene glycols and by (a) subjecting the compounds thus obtained to alkaline hydrolysis, thus obtaining the corresponding [17,16-d]-3′-carboxy-isoxazolino-20-oxo-pregnenes, decarboxylating the latter thermally to 17α-cyano-16α-hydroxy-20-oxo-pregnenes and treating these by means of alkylene-glycols, or (b) reacting the [17,16-d]-3′-carbalkoxy-isoxazolino-20-oxo-pregnenes with alkylene-glycols, if desired oxidizing a 3-hydroxy group to the 3-oxo-group, reacting the 3-oxo-pregnene-derivatives with alkylene-glycols and subjecting the [17,16-d]-3′-carbalkoxy-isoxazolino-20- alkylene-dioxy-pregnenes obtained to alkaline hydrolysis and decarboxylating them thermally to 17α-cyano-16α-hydroxy-20-alkylene-dioxy-pregnenes and by converting in the 17α-cyano-16α-hydroxy-20-alkylene-dioxy-pregnenes obtained according to (a) or (b) the cyano group into an acyl group by means of organometallic compounds and converting the 17α-acyl-16α-hydroxy-20-alkylene-dioxy-pregnenes obtained, by acid hydrolysis into 17α-acyl-16α-hydroxy-20-oxo-pregnenes.

If the starting material is a 3-keto-steroid of the general Formula I, the reaction, is for instance, performed according to the following scheme:

SCHEME OF FORMULAE

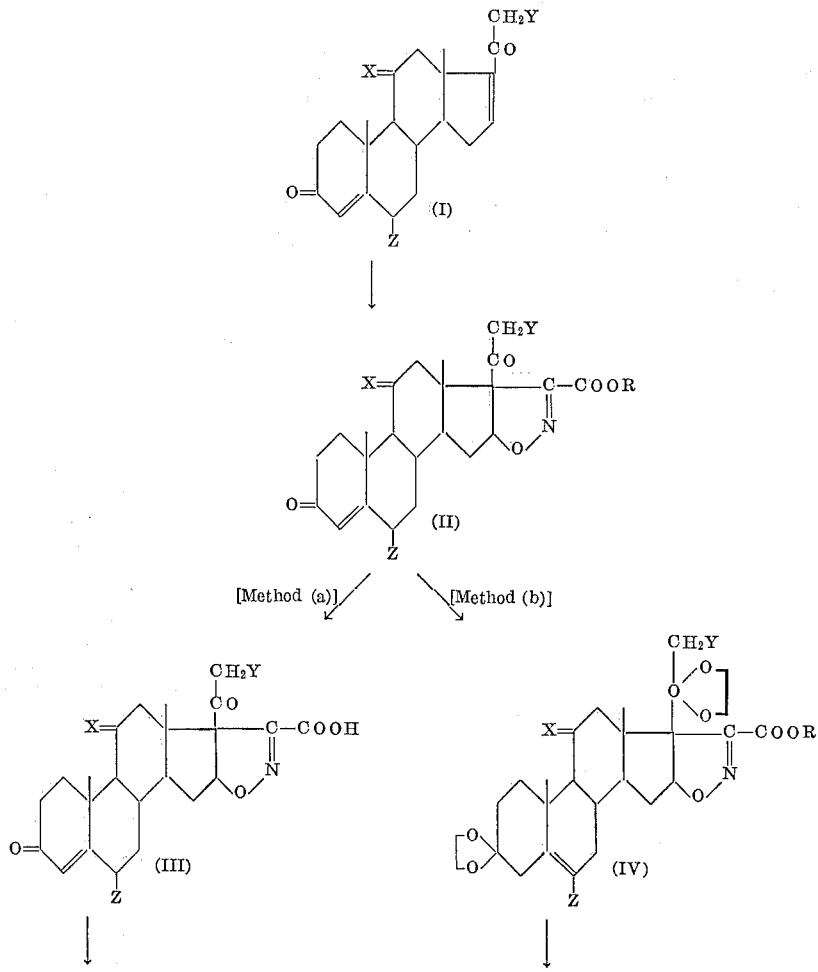

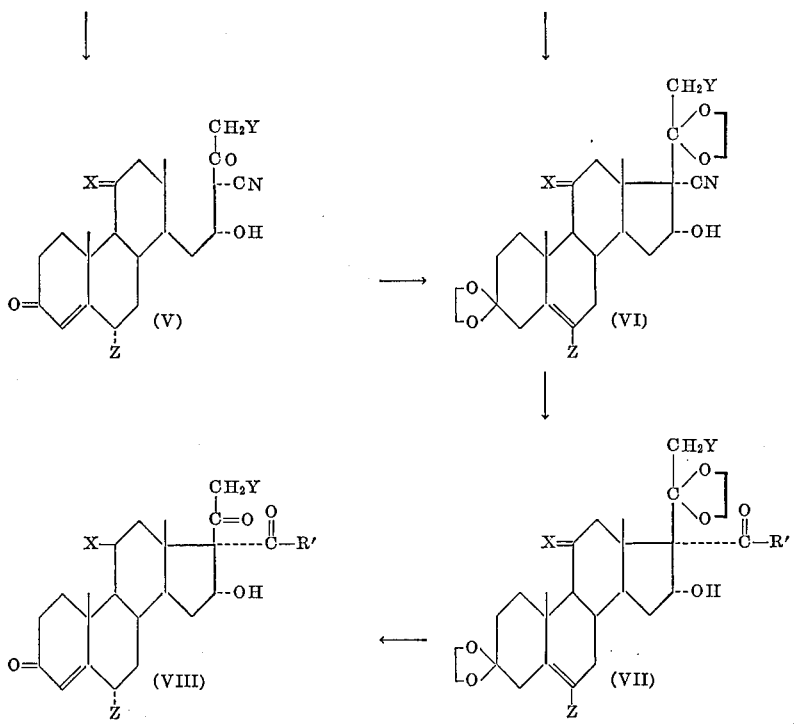

In the preceding formulea Z represents a hydrogen atom or the methyl group, X stands for 2 hydrogen atoms, one hydrogen atom and a hydroxy group, or a double-linked oxygen atom, Y represents hydrogen or a hydroxy group, R represents a low molecular alkyl group of preferably up to 4 carbon atoms and R' represents an alkyl of 1 to 3 carbon atoms.

If, for instance, a 3-hydroxy-pregnene derivative of the general Formula IX is used and after the condensation the oxidation of the 3-hydroxy group is carried out with a nitrile oxide, the compounds corresponding to the Formula II are, for instance, obtained according to the following scheme:

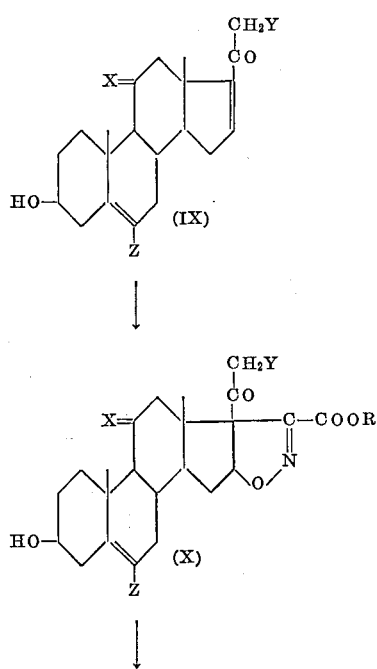

For carrying out the process, a 16-dehydro-20-oxo-pregnene derivative, for instance of the general Formula I or IX, is dissolved in a solvent inert to nitrile oxides, for instance, tetrahydrofurane, dioxane, benzene, ether or a low-molecular alcohol, if necessary likewise in a mixture of said solvents, and 1 to 5 equivalents of recently prepared nitrile oxide are added. The reaction can be carried out at temperatures between —20 and +60° C., most favorably between 0 and +20° C.

The nitrile oxides are obtained from the corresponding chloroximido-acetic acid esters by splitting off hydrogen halide. For this purpose, the reaction is suitably carried out with tertiary amines or with aqueous or aqueous-alcoholic alkali metal hydroxides, alkali metal carbonates or alkali metal alcoholates.

An advantageous form of carrying out the process consists in adding to the solution of the 16,17-dehydro-steroid, for instance of the general Formula I or IX, the chloroximido-acetic acid ester and, subsequently, an equivalent amount of a tertiary amine (slowly, within 2 to 30 minutes), favorably in an appropriate solvent. The nitrile oxide is formed in the reaction mixture. As tertiary amines, there are suitable, for instance, triethylamine, tripropylamine or tributylamine and similar low-molecular aliphatic tertiary amines. Generally, the reaction is performed within 1 to 14 hours.

For isolating the products of the invention, a sufficient amount of water is stirred into the reaction mixture, as far as the solvents used are miscible with water. In some cases, the precipitated isoxazoline, for instance of the general Formula II or X, can be separated by filtration. Preferably, however, a solvent immiscible with water is used for the extraction, the substance is washed with water, and the organic phase is then evaporated to dryness.

Following to the ring closure reaction of the first stage of the process, 3-hydroxy-[17,16-d]-3'-carbalkoxy-isoxazolino-20-oxo-pregnenes of the general Formula X obtained can be converted by oxidation, preferably by oxidation according to Oppenauer (reaction with aluminum alcoholates such, for instance, as aluminium-tert.butylate or aluminium isopropylate, in the presence of cyclohexanone in benzene- or in toluene-solution) into the corresponding 3,20-dioxo-derivatives.

The alkaline hydrolysis of the [17,16-d]-3'-carbalkoxy-isoxazolines to obtain the corresponding [17,16-d]-3'-carboxy-isoxazolines, i.e. the reaction corresponding, for instance, to the scheme of Formulae II→III, preferably occurs by boiling the substances for 5 to 15 minutes in alcoholic, preferably in methanolic alkali metal hydroxide solution of 5–10% strength.

The thermal decarboxylation of the [17,16 - d] - 3'-carboxy-isoxazoles into the 17α-cyano-16α-hydroxy-20-oxo-pregnene derivatives, for instance, according to III→V is carried out by heating the substance for 1 to 5 minutes to 190–215° C., favorably under reduced pressure or in the high vacuum. The reaction can likewise be accelerated by adding copper powder. When operating in this way, heating is abandoned immediately after the evolution of carbon dioxide is terminated.

When operating according to (b), it is, however, likewise possible to convert at first in the [17,16-d]-3'-carbethoxy-isoxazoline-20-oxo-pregnenes (for instance of the general Formula II or X) the 20-keto-functions into the ketal functions. For instance, these compounds are heated in the presence of a strong inorganic or organic acid to 50–150° C., preferably to 80–120° C., in glycols such as, for instance, ethylene-glycol, propylene-glycol, butylene-glycol or neopentyl-glycol, preferably ethylene-glycol or neopentyl-glycol. As strong inorganic or organic acids there can be used, for instance, p-toluene-sulfonic acid or sulfuric acid. If desired, inert organic solvents such, for instance, as benzene, toluene or xylene may be added. The forming water is permanently eliminated from the reaction mixture by distillation at the normal or under reduced pressure (up to 0.1 mm. of mercury).

The conversion of the oxo groups into ketal groups can likewise be effected by boiling under reflux for several hours (up to 20 hours) with alkylene glycols in the presence of ortho-formic acid alkyl esters under the catalytic influence of a strong acid such as p-toluene-sulfonic acid. If desired, an inert diluent, such, for instance, as dioxane may be added. As ortho-formic acid alkyl esters, the methyl or ethyl esters, for instance, may be used. 3-oxo groups which may be present in the starting compounds are likewise converted into the 3-ketal groups, as shown in the scheme of formulae.

The 17α-cyano-16α-hydroxy-20-oxo-pregnene derivatives (for instance those of the general Formula V) are converted in the manner described above by reaction with alkylene-glycols into the corresponding 20-alkylene-dioxy compounds (for instance of the general Formula VI). 3-oxo-groups which may be present are likewise converted into 3-ketal groups.

The smooth manner in which the 17α-cyano-16α-hydroxy-20-alkylene-dioxy-pregnenes can be prepared according to either method is very surprising. When preparing these substances via the carbethoxy or carboxy compounds catalyzed in 20-position, it was to be expected that, during the isolation of the carboxylic acid due to the acid medium as well as due to the temperature of about 200° C. at which the pyrolysis occurs, the ketal groups would be split off again. It was to be expected that hydrocyanic acid or water would be split off the 17α-cyano-16α-hydroxy compounds when ketalizing the 17α-cyano-16α-hydroxy-20-oxo-pregnenes.

Conversion of a 17α-cyano group into the 17α-acetyl group by means of organo-metallic compounds can be carried out, for instance, according to Grignard with alkyl-magnesium halides, preferably methyl-magnesium iodide, ethyl-magnesium iodide, propyl-magnesium iodide, allyl-magnesium iodide or methyl-magnesium bromide, ethyl-magnesium bromide, propyl-magnesium bromide, or allyl-magnesium bromide.

The reaction occurs in the presence of inert solvents, preferably ether, tetrahydrofurane, dioxane or diethylene-glycol-monomethyl ether or diethylene-glycol-dimethyl ether. The 17α-nitrile group can likewise be converted into an acyl group with the aid of alkyl alkali metal compounds, preferably methyl-lithium, ethyl-lithium, propyl-lithium or butyl-lithium or likewise with phenyl-lithium. Inert solvents are also useful for said conversion, benzene, toluene or xylene being preferred.

The 17α-acyl-16α-hydroxy-20-alkylene-dioxy-pregnenes are subjected to acid ketal splitting in order to obtain the corresponding 17α - acyl-16α-hydroxy-20-oxo-pregnenes whereby ketal groups additionally present in other positions of the steroid molecule, for instance in a 3-position, are likewise split into oxo-groups. When operating in this way, the steroid compounds carrying ketal groups are dissolved in solvents that are preferably miscible with water e.g., acetone, and methyl-ethyl-ketone or in alcohols such as, for instance, methanol and ethanol, and heated to the boil with water containing a strong acid, for instance sulfuric acid, perchloric acid or p-toluene-sulfonic acid, for a short period of about 30 seconds to five minutes, or allowed to stand up to 15 hours at a temperature between 0° and 30° C.

The 16α,-dehydro-20-oxo-pregnene derivatives to be used as starting substances for the process of the present invention may contain hydroxy or keto groups in either or both the 3- and 11-positions and double linkages in 5- or 4- or 1,4-positions.

As starting substances there are used, in particular, the following compounds:

$\Delta^{5,16}$-pregnadiene-3β-ol-20-one as well as its 3-acylates, preferably acetates, $\Delta^{5,16}$-6-methyl-pregnadiene-3β-ol-20-one as well as its 3-acylates, preferably acetates, $\Delta^{4,16}$-pregnadiene-3,20-dione, $\Delta^{4,16}$-6-methyl-pregnadiene-3,20-dione, $\Delta^{4,16}$-pregnadiene-3,11,20-trione, $\Delta^{4,16}$-pregnadiene-11-ol-3,20-dione, $\Delta^{5,16}$-pregnadiene-3,21-diol-20-one as well as its acylates, preferably acetates, $\Delta^{4,16}$-pregnadiene-21-ol-3,20-dione as well as its acylates, preferably acetates, $\Delta^{1,4,16}$-pregnatriene-3,20-dione and the 6-methyl-derivatives of the above-mentioned compounds.

According to their constitution, the products of the invention show gestagenic or anti-inflammatory action. Furthermore, they are used as intermediate products for the preparation of valuable medicaments.

The following examples serve to illustrate the invention but they are not intended to limit it thereto.

EXAMPLE 1

(a) [17,16-d]-3'-carbethoxy-isoxazolino-6α-methyl-$\Delta^4$-pregnene-3,20-dione To an ice-cooled solution of 4.76 grams of 6α-methyl-$\Delta^{4,16}$ - pregnadiene - 3,20 - dione and 6.6 grams of chloroximidoacetic ester in 60 milliliters of tetrahydrofurane there is added within 30 minutes a solution of 5.45 milliliters of triethylamine in 20 milliliters of absolute tetrahydrofurane. After standing for 4 hours at 0° C. and stirring for 3 hours and 20 minutes at 20° C. the reaction mixture is stirred into 300 milliliters of water, shaken out with methylene-chloride and the methylene-chloride extracts are brought to dryness under reduced pressure and after having been washed with water and dried over sodium sulfate. After trituration with a small amount of ether the crystals that have formed are filtered off. 3.63 grams of [17,16-d]-3′carbethoxy-isoxazolino-6α-methyl-$\Delta^4$-pregnene-3,20-dione are obtained, melting at 212° C.

(b) [17,16-d]-3′-carbethoxy-isoxazolino-6-methyl-3,20-bis-ethylene-dioxy-$\Delta^5$-pregnene 4.35 grams of [17,16-d]-3′-carbethoxy-isoxazolino-6α-methyl-$\Delta^4$-pregnene-3,20-dione, 0.137 gram of p-toluene-sulfonic acid and 93 milliliters of ethylene-glycol are subjected to slow distillation for 3 hours and 30 minutes under a pressure of 1.9 mm. Hg and at a temperature of 70–73° C. 50 milliliters of water are then added to the reaction mixture and a small amount of sodium hydroxide solution is added to render the solution alkaline. The crystals that have formed are filtered off with suction, dried under reduced pressure at 60° C. and recrystallized from methylene chloride/methanol in the presence of a very small amount of pyridine. 3.3 grams of [17,16-d]-3′-carbethoxy-isoxazolino - 3,20 - bisethylenedioxy-6-methyl-$\Delta^5$-pregnene are obtained, melting at 214° C. (on the Kofler heater).

(c) [17,16-d]-3′-carboxy-isoxazolino-3,20-bisethylenedioxy-6-methyl-$\Delta^5$-pregnene 3.3 grams of [17,16-d]-3′-carbethoxy-isoxazolino-3,20-bisethylenedioxy-6-methyl-$\Delta^5$-pregnene are heated to the boil for 7 minutes under reflux in a solution of 3.3 grams of potassium hydroxide in 66 milliliters of methanol. The reaction mixture is then stirred into 265 milliliters of water and carefully adjusted to a pH-value of 4.0 by means of glacial acetic acid and a small amount of diluted hydrochloric acid. The precipitating substance is filtered off with suction, washed two to three times with water and dried at 55° C. under reduced pressure. After recrystallization from a small amount of methanol containing a trace of pyridine, 2.934 grams of [17,16-d]-3′-carboxy - isoxazolino-3,20-bisethylenedioxy-6-methyl - $\Delta^5$-pregnene are obtained, melting at 264° C. (on the Kofler heater).

(d) 17α-cyano-16α-hydroxy-3,20-bisethylenedioxy-6-methyl-$\Delta^5$-pregnene 2.9 grams of finely pulverized [17,16-d]-3′-carboxy-isoxazolino-3,20-bis ethylenedioxy-6-methyl - $\Delta^5$-pregnene are heated under a pressure of 0.5 mm. Hg for 3 minutes and 40 seconds to 210° C. After the reaction which occurs with foaming up (carbon dioxide evolution) is terminated, the crude product is recrystallized from methylene-chloride/methanol in the presence of a trace of pyridine. 1.52 grams of 17α-cyano-16α-hydroxy-3,20-bisethylenedioxy-6-methyl-$\Delta^5$-pregnene of a meltiing point of 275° C. are obtained.

(e) 17α-acetyl-16α-hydroxy-3,20-bisethylenedioxy-6-methyl-$\Delta^5$-pregnene

To 20 milliliters of a boiling Grignard reaction solution prepared from 2.2 grams of magnesium and 5.7 milliliters of methyl-iodide in 50 milliliters of absolute ether a solution of 630 milligrams of 17α-cyano-16α-hydroxy-3,20-bisethylenedioxy-6-methyl-$\Delta^5$-pregnene in 35 milliliters of absolute tetrahydrofurane is dropwise added and the mixture is boiled, while stirred, over a nitrogen atmosphere for 7 hours under reflux. The mixture is abandoned overnight and the organo-metallic complex is decomposed by means of concentrated ammonium-chloride solution, while stirring for 1 hour at 0° C. The mixture is extracted with methylene-chloride, the organic phase is washed with water, the solvent is distilled off and the residue is crystallized by means of a small amount of methanol containing a drop of pyridine. 499 milligrams of 17α-acetyl-16α-hydroxy-3,20-bisethylenedioxy-6-methyl-$\Delta^5$-pregnene of a melting point of 205–208° C. (on the Kofler heater) are obtained.

(f) 17α-acetyl-16α-hydroxy-6α-methyl-$\Delta^4$-pregnenedione-(3,20)

450 milligrams of 17α-acetyl-16α-hydroxy-3,20-bisethylenedioxy-6-methyl-$\Delta^5$-pregnene in a mixture of 24 milliliters of ethanol, 18 milliliters of water and 3 drops of concentrated sulfuric acid are heated to the boil for 5 minutes and under reflux in a nitrogen atmosphere. The mixture is then cooled, any undissolved matter is filtered off and the filtrate is poured into bicarbonate solution cooled with ice. After extracting 3 times with ether, the combined ether extracts are washed with water, dried over sodium sulfate and evaporated to dryness under reduced pressure. The residue obtained crystallizes after prolonged standing. The crystals obtained after trituration with 1–2 milliliters of methanol are filtered off with suction. 120 milligrams of 17α-acetyl-16α-hydroxy-6α-methyl-$\Delta^4$-pregnenedione-(3,20) of a melting point of 230–232° C. (Kofler heater) are obtained.

EXAMPLE 2

(a) [17,16-d]-3′-carbethoxy-isoxazolino-$\Delta^4$-pregnenedione-(3,20)

To a solution cooled with ice and consisting of 19 grams of $\Delta^{4,16}$-pregnadiene-dione-(3,20) and 26.4 grams of chloroximido-acetic ester in 250 cc. of tetrahydrofurane a solution of 22 cc. of triethylamine in 80 cc. of tetrahydrofurane is added within 2 hours. After stirring for 5 hours at 0° C. and standing overnight at 20° C., the reaction mixture is poured into 1000 cc. of water and then extracted several times with methylene-chloride. The combined methylene-chloride extracts are washed with water until showing a neutral reaction and dried over sodium sulfate. After elimination of the solvent by distillation a crystallizing oil remains behind which is recrystallized from methanol. 15.9 grams of [17,16 - d] - 3′ - carbethoxy-isoxazolino-$\Delta^4$-pregnene-dione-(3,20) are obtained in the form of fine, white crystals which melt at 209–210° C.

(b) [17,16-d]-3′-carbethoxy-isoxazolino-(3,20-bis-ethylenedioxy)-$\Delta^5$-pregnene 27 grams of [17,16-d]-3′-carbethoxy-isoxazolino - $\Delta^4$-pregnene-dione-(3,20) (prepared as described in Example 2a) are formed to a suspension with 765 milligrams of p-toluene-sulfonic acid in 500 cc. of distilled ethylene-glycol. While the reaction mixture is stirred, the major part of the glycol is slowly distilled over within 5 hours and 30 minutes in the high vacuum at about 1 mm. of mercury (bath temperature 100–120° C.). After one and after two and a half hours upon the start of the reaction, a further 100 cc. of ethylene glycol are added each time to the reaction mixture. Upon termination of the reaction, the reaction mixture is allowed to cool, it is adjusted to an alkaline pH-range by means of dilute aqueous sodium hydroxide solution, diluted with water, the crystalline precipitate is filtered off, washed with water until showing a neutral reaction and dried under reduced pressure. After recrystallization from a mixture of methanol and acetic ester, 20 grams of [17,16-d]-3′-carbethoxy-isoxazolino-(3,20-bis-ethylene-dioxy)-$\Delta^5$-pregnene are obtained (61.5 %). Melting point of the substance: 216–218° C.

IR-spectrum: 1725, 1250 (3′ - $COOC_2H_5$), 1595 (C=N), 1100–1120 (3- and 20-ketal) cm.$^{-1}$.

(c) [17,16-d]-3′-carboxy-isoxazolino-(3,20-bis-ethylenedioxy)-$\Delta^5$-pregnene 2.2 grams of [17,16-d]-3′-carbethoxy-isoxazolino-(3,20-bis-ethylenedioxy)-$\Delta^5$-pregnene are boiled under reflux for 10 minutes in 45 cc. of methanolic potassium hydroxide solution of 6% strength. The reaction mixture is then poured onto 200 cc. of water, acidified carefully by means of 2 N-aqueous hydrochloric acid until a pH-value of 5 is attained, the separated precipitate is immediately filtered off and washed with water until showing a neutral reaction. After drying in the vacuum over $P_2O_5$, 2.04 grams of [17,16-d]-3'-carboxy-isoxazolino-(3,20-bis-ethylene - dioxy)-$\Delta^5$-pregnene (98.1%) are obtained. Melting point 242–246° C. (at 162° C. foaming up).

*IR-spectrum:* large bands at 3050–3500 (3'-COOH), bands at 1725 (3'-COOH), 1595 (C=N), 1100 (3,20-diketal) cm.$^{-1}$.

(d) *17α-cyano-16α-hydroxy-(3,20-bisethylene-dioxy)-$\Delta^5$-pregnene*

1.7 grams of [17,16-d]-3'-carboxy-isoxazolino-(3,20-bisethylene-dioxy)-$\Delta^5$-pregnene are slowly heated for 3 minutes to about 200° C. in the high vacuum at 0.1 mm. Hg in a flask with a long tapering neck of a capacity of 100 cc. until the evolution of $CO_2$ is terminated. The cooled pyrolysis residue is filtered in order to be cleaned with, totally, 500 cc. of methylene-chloride over a small amount of $Al_2O_3$. (Woelm, neutral, Akt.-St. II; column measures: $h=7$, $\phi=3$ cm.). After elimination of the solvent by distillation and recrystallization from a mixture of methanol and ether 870 milligrams of 17α-cyano-16α-hydroxy-(3,20-bisethylene-dioxy)-$\Delta^5$-pregnene are obtained in the form of fine white crystals (=56.5%). Melting point 271° C.

*IR-spectrum:* 3580 (16α-OH), 2240 (17—C=N), 1095 (3,20-diketal) cm.$^{-1}$.

(e) *17α-acetyl-16α-hydroxy-(3,20-bisethylene-dioxy)-$\Delta^5$-pregnene*

To 20 cc. of a boiling Grignard reaction solution prepared from 2.2 grams of magnesium and 5.7 cc. of methyl-iodide in 50 cc. of absolute ether a solution of 610 milligrams of 17α-cyano-16α-hydroxy-(3,20-bisethylene - dioxy)-$\Delta^5$-pregnene in 35 cc. of absolute tetrahydrofurane is added and the mixture is boiled while stirred over an atmosphere of nitrogen for 7 hours under reflux. Immediately after the nitrile component has been dropwise added, a milky precipitate separates. The mixture is then allowed to stand overnight and the organo-metallic complex is decomposed with concentrated aqueous ammonium-chloride solution, by stirring it for 1 hour at 0° C. It is then extracted by means of methylene-chloride, the organic phase is washed with water, the solvent is distilled off and the residue is crystallized from a mixture of ether and n-hexane. 385 milligrams of 17α-cyano-16α-hydroxy-(3,20-bisethylene-dioxy)-$\Delta^5$ - pregnene (60.5%) are obtained, which when recrystallized from ether show a melting point of 202–203° C.

*IR-spectrum:* 3450 (16α-OH), 1695 (17α-COOH$_3$), 1095 (3,20-diketal) cm.$^{-1}$.

(f) *17α-acetyl-16α-hydroxy-$\Delta^4$-pregnene-dione-(3,20)*

360 milligrams of 17α-acetyl-16α-hydroxy-(3,20-bisethylene-dioxy)-$\Delta^5$-pregnene are boiled for 5 minutes under reflux over a $N_2$-atmosphere in a mixture of 20 milliliters of ethanol of 96% strength and 15 milliliters of distilled water to which 2 drops of concentrated sulfuric acid had been added. The reaction mixture is then poured on an aqueous sodium-bicarbonate solution cooled with ice, it is extracted several times with ether, washed with water until showing a neutral reaction, dried by means of sodium sulfate and the solvent is distilled off under reduced pressure. 223 milligrams of 17α-acetyl-16α-hydroxy-$\Delta^4$-pregnene-dione-(3,20) (78.6%) are obtained in the form of a crystalline residue which is recrystallized from a small amount of acetone and ether. Melting point 151–153° C.

*IR-bands:* 3480 (16α-OH), 1710 (20-CO and 17α-COCH$_3$), 1670 ($\Delta^4$-double linkage) cm.$^{-1}$.

EXAMPLE 3

(a) *[17,16-d]-3'-carboxy-isoxazolino-$\Delta^4$-pregnene-dione-(3,20)*

13.9 grams of [17,16-d]-3'-carbethoxy-isoxazolino-$\Delta^4$-pregnene-dione-(3,20), (prepared according to Example 2(a)) are dissolved in 300 cc. of a methanolic potassium hydroxide solution of 6% strength and 30 cc. of tetrahydrofurane and heated to the boil for 15 minutes under reflux. The reaction mixture is then poured on 1200 cc. of water and acidified by means of aqueous 2 N-sulfuric acid. The separated crystalline precipitate is filtered off and washed with water until showing a neutral reaction. After drying in the exsiccator under reduced pressure over phosphorus pentoxide 12.1 grams of [17,16-d]-3'-carboxy isoxazolino-$\Delta^4$-pregnene-dione-(3,20) are obtained in the form of fine crystals which, when recrystallized from tetrahydrofurane and n-hexane melt at 185–190° C. with evolution of gas.

(b) *17α-cyano-16α-hydroxy-$\Delta^4$-pregnene-dione-(3,20)*

7.5 grams of [17,16-d]-3'-carboxy-isoxazolino-$\Delta^4$-pregnene-dione-(3,20) are subjected to pyrolysis in three equal portions in flasks with long tapering necks of a capacity of 100 cc. each, at a temperature of the oil bath of 200–210° C. each, in the high vacuum at 0.01 mm. Hg. After about 3 to 5 minutes the evolution of carbon dioxide is terminated each time. After cooling of the contents of the flasks the substances are combined and the pyrolysis product is chromatographed to aluminium oxide according to Brockmann. (Column measures: $h=8$, $\phi=3$ cm.). The product is extracted with tetrahydrofurane/methylene chloride and eluated with 1400 cc. of methylene-chloride. After elimination of the solvent by distillation, the solid residue is recrystallized from a small amount of methylene chloride and ether. 4.8 grams of 17α - cyano - 16α - hydroxy-$\Delta^4$-pregnene-dione-(3,20) are obtained in the form of white crystals. Melting point 228–229° C.

(c) *17α-cyano-16α-hydroxy-(3,20-bisethylene-dioxy)-$\Delta^5$-pregnene*

2.3 grams of 17α-cyano-16α-hydroxy-$\Delta^4$-pregnene-dione-(3,20) are suspended with 100 milligrams of p-toluene-sulfonic acid in 70 cc. of distilled ethylene-glycol. With magnetic stirring of the reaction mixture the major part of the glycol is slowly distilled over within five and a half hours in the vacuum under a pressure of about 10 mm. Hg. (Bath temperature about 120° C.). After 1 hour and 2½ hours upon start of the reaction a further 90 cc. of ethylene-glycol are added each time to the reaction mixture. After termination of the reaction, the reaction mixture is allowed to cool, adjusted to an alkaline pH-range by means of alcoholic sodium hydroxide solution, diluted with water, the crystalline precipitate is filtered off, washed with water until showing a neutral reaction and dried. After recrystallization from a mixture of methanol and acetic ester 1.74 grams of 17α-cyano-16α-hydroxy-(3,20 - bisethylene - dioxy)-$\Delta^5$-pregnene are obtained (C=61.0%) which after repeated recrystallization show a melting point of 271° C.

The further reactions are carried out as described in Example 2(e) and (f).

EXAMPLE 4

(a) *[17,16-d]-3'-carboxy-isoxazolino-6α-methyl-$\Delta^4$-pregnene-3,20-dione*

1 gram of [17,16-d]-3'-carbethoxy-isoxazolino-6α-methyl-$\Delta^4$-pregnene-3,20-dione prepared as described in Example 1(a) is heated to the boil for 6 minutes under reflux in a solution of 1 gram of potassium hydroxide in 20 milliliters of methanol. 80 milliliters of water are then added and the mixture is acidified by means of 2 N-hydrochloric acid. The crystals separated are filtered off, washed with water and dried under reduced pressure. 805 milligrams of [17,16-d]-3'-carboxy-isoxazolino-6α-methyl-$\Delta^4$-pregnene-3,20-dione are obtained which melt at 242° C. (Kofler heater).

(b) *17α-cyano-16α-hydroxy-6α-methyl-$\Delta^4$-pregnene-3,20-dione*

700 milligrams of [17,16-d]-3'-carboxy-isoxazolino-6α-methyl-$\Delta^4$-pregnene-3,20-dione are heated for 75 seconds under a pressure of 0.2 mm. Hg to 208° C. The reaction mixture is then recrystallized from a mixture of methylene-chloride and ether. 382 milligrams of 17α-cyano-16α-hydroxy-6α-methyl-Δ⁴-pregnene-3,20-dione are obtained which melt at 285° C.

(c) The compound obtained can be ketalized with ethylene-glycol in the manner described in Example 3(c) and converted into 17α - acetyl - 16α - hydroxy - 6α-methyl - Δ⁴ - pregnene - dione - (3,20) as described in Example 2(e) and (f).

EXAMPLE 5

(a) [17,16-d]-3'-carbethoxy-isoxazolino-6-methyl-Δ⁵-pregnene-3β-ol-20-one

To a solution of 6.74 grams of 6-methyl-16-dehydropregnolone and 12.4 grams of chloroximido-acetic ester in 80 milliliters of tetrahydrofurane there is added within 30 minutes, while cooling with ice a solution of 10.2 milliliters of triethylamine in 30 milliliters of tetrahydrofurane. The mixture is then stirred for 4 hours at 0° C. and subsequently for two and a half hours at 20° C. The reaction mixture is stirred into 250 milliliters of water and shaken out with methylene-chloride. After washing with water and drying over sodium sulfate the combined organic extracts are evaporated to dryness under reduced pressure. The residue of the distillation is triturated with 20 milliliters of ether, whereby crystallization is provoked. After filtration, 3.9 grams of [17,16-d]-3' - carbethoxy - isoxazolino - 6 - methyl - Δ⁵ - pregnene-3β-ol-20-one are obtained which melt at 151° C. (Kofler heater).

(b) [17,16-d]-3'-carboxy-isoxazolino-6α-methyl-Δ⁴-pregnene-3,20-dione

From a solution of 3.3 grams of [17,16-d]-3'-carbethoxy - isoxazolino - 6 - methyl - Δ⁵ - pregnene - 3β - ol-20-one in 96 milliliters of toluene and 90 milliliters of cyclohexane 8 milliliters of toluene are eliminated by distillation. After addition of a solution of 3.25 grams of aluminium-isopropylate in 11 milliliters of toluene the mixture is heated to the boil for 45 minutes under reflux. The reaction mixture is then subjected to steam distillation. The distillation residue is then evaporated to dryness and extracted with a mixture of methylene chloride and acetone.

(c) The crude [17,16-d] - 3' - carbethoxy - isoxazolino-6α - methyl - Δ⁴ - pregnene - 3,20 - dione obtained after evaporation of the solvent is further reacted as described in Example 1(b)–(f).

EXAMPLE 6

(a) 17a-acetyl-16α-hydroxy-6α-methyl-Δ⁴-pregnene-dione-(3,20)

The crude [17,16-d] - 3' - carbethoxy - isoxazolino-6α - methyl - Δ⁴ - pregnene - 3,20 - dione obtained as described in Example 5(a) and (b) is heated to the boil for 6 minutes under reflux in a mixture of 20 milliliters of methanol and 8 milliliters of 2 N-sodium hydroxide solution. The reaction mixture is poured into 50 milliliters of water and extracted with ether. The aqueous phase is acidified by means of 2 N-hydrochloric acid and then extracted with methylene-chloride. After drying over sodium sulfate the methylene-chloride extract is evaporated to dryness under reduced pressure. After recrystallization from ether and a small amount of acetone 1.12 g. of [17,16-d] - 3' - carboxy - isoxazolino - 6α-methyl - Δ⁴ - pregnene - 3,20 - dione are obtained melting at 212° C. (Kofler heater).

(b) 17α-cyano-16α-hydroxy-6α-methyl-Δ⁴-pregnene-3,20-dione 950 milligrams of [17,16-d]-3'-carboxy-isoxazolino-6α-methyl-Δ⁴-pregnene-3,20-dione are heated for 2 minutes to 208° C. under a pressure of 0.2 mm. of mercury. By recrystallization of the crude product from a mixture of methylene chloride and methanol 320 milligrams of 17α-cyano - 16α - hydroxy - 6α - methyl - Δ⁴ - pregnene - 3,20-dione of a melting point of 285° C. are obtained.

(c) The compound obtained can be ketalized with ethylene-glycol in the manner described in Example 3(c) and can be converted into the 17α - acetyl - 16α - hydroxy-6α - methyl - Δ⁴ - pregnene - dione - (3,20) in the manner described in Example 2(e) and (f).

EXAMPLE 7

(a) [17,16-d]-3'-carbethoxy-isoxazolino-Δ⁵-pregnene-3β-ol-20-one-3-acetate

A solution of 4.33 grams of chloroximido-acetic ester in 30 milliliters of absolute tetrahydrofurane is added while stirring, cooling with ice, to a solution of 4.4 grams of Δ⁵,¹⁶-pregnadiene-3β-ol-20-one-3-acetate in 40 milliliters of tetrahydrofurane. To this mixture there is added while stirring and cooling with ice within 10 minutes a solution of 3.35 milliliters of triethylamine in 10 milliliters of absolute tetrahydrofurane. After standing for 4 hours and 30 minutes at 0° C. the reaction mixture is stirred into 100 milliliters of aqueous sodium bicarbonate solution and shaken out several times with benzene. The combined benzene extracts are evaporated to dryness under reduced pressure after having been washed with water and dried with sodium sulfate. After recrystallization from methanol, 5 grams of [17,16-d]-3'-carbethoxy - isoxazolino - Δ⁵ - pregnene - 3β - ol - 20 - one - 3-acetate are obtained which melt at 162° C. (Kofler heater).

(b) [17,16-d]-3'-carboxy-isoxazolino-Δ⁵-pregnene-3β-ol-20-one 1 gram of [17,16-d] - 3' - carbethoxy - isoxazolino-Δ⁵ - pregnene - 3β - ol - 20 - one - 3 - acetate are heated to the boil for 15 minutes under reflux in 25 milliliters of methanolic potassium hydroxide solution of 6% strength. The reaction mixture is then stirred into 200 milliliters of water and the clear solution is acidified by means of 2 N-sulfuric acid. The precipitate filtered off is washed with water until showing a neutral reaction and after drying under reduced pressure is recrystallized from acetone. 805 milligrams of [17,16-d] - 3' - carboxy-isoxazolino - Δ⁵ - pregnene - 3β - ol - 20 - one are obtained which melt at 202–204° C. (decomposition, Kofler heater).

(c) 17α-cyano-16α-hydroxy-Δ⁵-pregnene-3β-ol-20-one 920 milligrams of [17,16-d] - 3' - carboxy - isoxazolino-Δ⁵ - pregnene - 3β - ol - 20 - one are heated in the high vacuum for 3 minutes to 200–210° C. After this period of time the evolution of carbonic acid is terminated. The mixture is immediately cooled and recrystallized from acetic ester. 330 milligrams of 17α - cyano - 16α-hydroxy - Δ⁵ - pregnene - 3β - ol - 20 - one are obtained which melt at 220-222° C.

We claim:
1. A compound of the formula

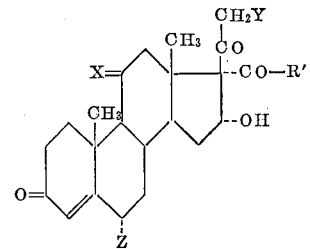

wherein X represents two hydrogens, a hydrogen and a hydroxy group, or keto, Y is a member selected from the group consisting of hydrogen and hydroxy, Z is a member selected from the group consisting of hydrogen and methyl and R' is an alkyl radical containing 1 to 3 carbon atoms.

2. A compound of the formula

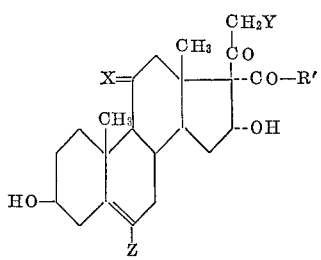

wherein X represents two hydrogens, a hydrogen and a hydroxy group, or a keto oxygen; Y is hydrogen or hydroxy; Z is hydrogen or methyl; and R' is an alkyl of 1 to 3 carbon atoms.

3. A compound of the formula

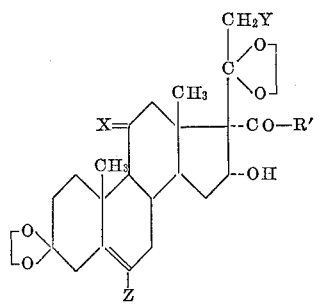

wherein X represents two hydrogens, a hydrogen and a hydroxy group, or a keto oxygen; Y is hydrogen or hydroxy; Z is hydrogen or methyl; and R' is an alkyl of 1 to 3 carbon atoms.

4. 17α-acetyl-16α-hydroxy-Δ⁴-pregnene-dione (3,20).

5. 17α - acetyl - 16α - hydroxy - (3,20 - bis - ethylenedioxy)-Δ⁵-pregnene.

6. A compound of the formula

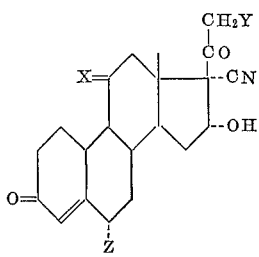

wherein X represents two hydrogens, a hydrogen and a hydroxy group, or a keto oxygen; Y is hydrogen or hydroxy; and Z is hydrogen or methyl.

7. 17α-cyano-16α-hydroxy-6α-methyl-Δ⁴-pregnene-3,20-dione.

8. 17α-cyano-16α-hydroxy-(3,20-bis-ethylene-dioxy)-Δ⁵-pregnene.

9. A compound of the formula

wherein X represents two hydrogens, a hydrogen and a hydroxy group, or a keto oxygen; Y is hydrogen or hydroxy; Z is hydrogen or methyl; the 3-carbon atom is substituted by a keto oxygen, an alkylene-dioxy group, or β-hydroxy; the 17-carbon atom is α-substituted by —CN or —COR', R' being an alkyl of 1 to 3 carbon atoms; and the 20-carbon atom is substituted by a keto oxygen or an alkylene-dioxy group.

10. 17α - cyano - 16α - hydroxy - 3,20-bisethylenedioxy-6-methyl-Δ⁵-pregnene.

11. 17α - acetyl - 16α - hydroxy - 3,20 - bisethylenedioxy-6-methyl-Δ⁵-pregnene.

12. 17α - acetyl - 16α - hydroxy - 6α - methyl - Δ⁴-pregnene- 3,20-dione.

13. 17α - cyano - 16α - hydroxy - (3,20 - bisethylenedioxy)-Δ⁵-pregnene.

14. 17α-cyano-16α-hydroxy-Δ⁴-pregnene-dione-(3,20).

15. 17α-cyano-16α-hydroxy-Δ⁵-pregnene-3β-ol-20-one.

No references cited.

LEWIS GOTTS, *Primary Examiner.*

HENRY A. FRENCH, *Assistant Examiner.*